US 8,806,939 B2

(12) United States Patent
Painter

(10) Patent No.: US 8,806,939 B2
(45) Date of Patent: Aug. 19, 2014

(54) DISTRIBUTED MASS HEMISPHERICAL RESONATOR GYROSCOPE

(75) Inventor: Chris Painter, Dublin, CA (US)

(73) Assignee: Custom Sensors & Technologies, Inc., Moorpark, CA (US)

( * ) Notice: Subject to any disclaimer, the term of this patent is extended or adjusted under 35 U.S.C. 154(b) by 222 days.

(21) Appl. No.: 12/966,700

(22) Filed: Dec. 13, 2010

(65) Prior Publication Data

US 2012/0144917 A1    Jun. 14, 2012

(51) Int. Cl.
*G01C 19/56* (2012.01)
*G01C 19/5691* (2012.01)

(52) U.S. Cl.
CPC ................. *G01C 19/5691* (2013.01)
USPC ........................................ 73/504.13

(58) Field of Classification Search
CPC .................................. G01C 19/5691
USPC ............................. 73/504.13, 504.12
See application file for complete search history.

(56) References Cited

U.S. PATENT DOCUMENTS

| 3,657,063 | A |   | 4/1972 | Brown et al. |
|---|---|---|---|---|
| 4,940,636 | A |   | 7/1990 | Brock et al. |
| 4,951,508 | A | * | 8/1990 | Loper et al. ............... 73/504.13 |
| 5,450,751 | A | * | 9/1995 | Putty et al. ............... 73/504.18 |
| 5,712,427 | A |   | 1/1998 | Matthews |
| 6,272,925 | B1 | * | 8/2001 | Watson ..................... 73/504.12 |
| 6,640,630 | B1 | * | 11/2003 | de Salaberry ............ 73/504.13 |
| 7,155,978 | B2 | * | 1/2007 | Lo et al. .................... 73/504.13 |
| 7,318,347 | B2 |   | 1/2008 | Lynch |
| 8,338,205 | B2 |   | 12/2012 | Huang |
| 2006/0270147 | A1 |   | 11/2006 | Ahn et al. |
| 2007/0119258 | A1 |   | 5/2007 | Yee |
| 2009/0031831 | A1 |   | 2/2009 | Stewart |
| 2011/0239763 | A1 |   | 10/2011 | Shkel et al. |
| 2011/0290021 | A1 |   | 12/2011 | Horning et al. |
| 2013/0015437 | A1 |   | 1/2013 | Yamazaki |
| 2013/0037793 | A1 |   | 2/2013 | Pan et al. |
| 2013/0050290 | A1 |   | 2/2013 | Andersson et al. |
| 2013/0100065 | A1 |   | 4/2013 | Felnhofer et al. |
| 2013/0104653 | A1 |   | 5/2013 | Bernstein et al. |

FOREIGN PATENT DOCUMENTS

| EP | 0300579 A2 | 1/1989 |
|---|---|---|
| EP | 1923667 A2 | 5/2008 |
| EP | 2390624 A2 | 11/2011 |
| GB | 2272053 A | 5/1994 |
| WO | 2009017623 A1 | 2/2009 |

OTHER PUBLICATIONS

Skaggs, S. R.; Zero and Low Coefficient of Thermal Expansion Polycrystalline Oxides; Sep. 1977.
Duwel, Amy et al.; Experimental Study of Thermoelastic Damping in MEMS Gyros; Sensors and Actuators A 103 (2003).

(Continued)

*Primary Examiner* — John Chapman, Jr.
(74) *Attorney, Agent, or Firm* — Hunter Clark PLLC

(57) ABSTRACT

A micro-scale hemispherical resonator gyroscope includes a hemispherical resonator with a plurality of masses positioned around the periphery of the hemispherical resonator. At least some of the masses may be made of a heavy metal, such as tungsten, gold, platinum, or lead, and may be positioned at points of maximum deflection or velocity of the resonator. The hemispherical resonator may have a 2 mm diameter and a ring down time of at least 500 seconds.

27 Claims, 12 Drawing Sheets

(56) References Cited

OTHER PUBLICATIONS

Sneh, Ofer; Strategies for High-Productivity ALD; Solid State Technology, vol. 46, Issue 11; (http://www.electroiq.com//content/eiq-w/en/articles/sst/print/volume-46/issue-11/departments/feol/strategies-for-high-productivity-ald.html); Nov. 1, 2003.

International Search Report and Written Opinion for PCT/US2013/026836 dated Jun. 3, 2013.

Ruh, Robert et al.: Phase Relations and Thermal Expansion in the System HfO2-TiO2; Journal of the American Ceramic Society; Aug. 4, 1976, pp. 495-499, vol. 59, Illinois.

European Search Report dated Feb. 21, 2014 for European Application No. 11193233.1, 9 pages.

Non-Final Office Action; U.S. Appl. No. 13/419,816; Apr. 1, 2014.

* cited by examiner

DISTRIBUTED MASS HEMISPHERICAL RESONATOR GYROSCOPE

BACKGROUND

Hemispherical resonator gyroscopes have been around for many years and are considered the highest performing vibratory rotation sensors on the market. A typical hemispherical resonator gyroscope includes a fused silica hemisphere that is driven by a forcer electrode and sensed using a separate set of pickoff electrodes. The hemispherical resonator gyroscope may measure rotation rates or rotation angles through the rotational-vibrational coupling (e.g., Coriolis coupling) between structural modes of the gyroscope. One of the modes, designated the drive mode, is initially made to oscillate at high levels of velocity. Rotation induced Coriolis force then couples motion from the first mode into a secondary structural mode with a magnitude proportional to the magnitude of the input rotation. The most commonly used vibrational modes used in hemispherical resonator gyroscopes are the two cos 2θ modes, named for their mode shape.

The ring down time is a figure of merit of every hemispherical resonator gyroscope and is commonly designated by the symbol τ. The ring down time may be considered the amplitude decay constant of the hemispherical resonator of the gyroscope if all external forces are removed and the hemisphere is allowed to freely oscillate. The ring down time may also quantify the amount of effort required to maintain the oscillation pattern of the hemispherical resonator, where a hemispherical resonator with a larger ring down time requires less effort. The ring down time is proportional to the equivalent mass (m) and damping coefficient (b) of the hemispherical resonator where τ=2 m/b. As is understood by those skilled in the art, mathematically, the equivalent mass of a hemispherical resonator gyroscope can of a be thought of as a series of point masses located at the points of maximum velocity or maximum deflection for the two mode shapes where the rest of the hemisphere is assumed to be massless. In a hemisphere, the equivalent mass is roughly equal to one third the total mass of the hemisphere. To increase the ring down time, τ, the equivalent mass of the hemispherical resonator of the gyroscope may be made larger, typically through increasing the hemisphere diameter. However, there are many applications that call for a fixed size hemisphere or a microscale gyroscope where increasing the size of the hemisphere is not feasible or practical.

For example, some applications (e.g., personal or mobile applications) may constrain or restrict the form factor of the hemisphere to be no more than a particular diameter. In addition, some applications (e.g., military or outdoor applications) may constrain or restrict the power supplied to the gyroscope. For example, in a power loss environment, the ring down time may dictate how the long the gyroscope will continue to operate without being driven. Thus, increasing the ring down time of a hemispherical resonator gyroscope is typically at odds with maintaining the form factor of the gyroscope.

SUMMARY

In view of the foregoing, a hemispherical resonator gyroscope, and methods for making and operating the same, are provided. The gyroscope includes a substrate with a plurality of pickoff electrodes that are used to sense the azimuth orientation of the vibration pattern of a hemispherical resonator and apply control forces, for example, to suppress unwanted quadrature effects. A ring forcer electrode is configured to drive the hemispherical resonator. Voltage may be applied to the forcer electrode to control the amplitude of a standing wave associated with the resonator. The plurality of pickoff electrodes may be used to determine the location and amplitude of the standing wave and additionally apply control forces to, for example, suppress unwanted quadrature effects. For example, the pickoff electrodes may include capacitor electrodes. The capacitance of the pickoff electrodes may be modulated at the resonator flexing frequency. The capacitance changes in the pickoff electrodes may then be used to determine rotation rates or rotation angles through the rotational-vibrational coupling (e.g., Coriolis coupling) between structural modes of the gyroscope.

The equivalent mass of the hemispherical resonator may be increased by positioning masses around the periphery of the hemispherical resonator. For example, a plurality of masses may be positioned around the periphery of the hemispherical resonator outer rim. The masses may be made of any heavy metal, such as tungsten, gold, platinum, or lead, or any combination thereof. The masses may be positioned at points of maximum deflection or velocity of the hemispherical resonator. For example, in some embodiments, in a resonator using the two cos 2θ vibrational modes, eight masses are distributed at approximately 45 degree increments around the periphery of the resonator outer rim. In some embodiments, the shape of each mass may take a shape that is symmetric about the radial vector going out to that mass. For example, circular, square, rectangular, or pie-shaped wedge masses may be used. The weights of the masses may be identical in some embodiments, and may depend on several factors, including, for example, expected damping levels and the desired ring down time, τ. In other embodiments, the weights of the masses may vary about the periphery of the hemisphere with heavier masses located at maximum points of deflection associated with the vibrational modes of the resonator. Lighter masses may be positioned between points of maximum deflection, equally spaced around the periphery of the hemisphere.

In some embodiments, a 2 mm (or smaller) hemisphere diameter is used and masses are positioned around the periphery of the hemisphere outer rim so as to yield at least 500 seconds of ring down time. The gyroscope may be coupled to, or in communication with, a wireless transceiver so that measurements from the gyroscope may be wirelessly transmitted to a remote location. For example, the measurements may be transmitted to a network storage device for storage, processing, or logging. The measurements may also be transmitted to an inertial navigation or positioning system. The inertial navigation or positioning system may also receive other sensor inputs (e.g., inputs from motions sensors such as accelerometers) in order to determine the position, location, or orientation of an object associated with the gyroscope.

For example, in some embodiments, the object is an animal or person, and the gyroscope is associated with the animal or person. The gyroscope may be attached to, or integrated with, clothing (e.g., a boot or shoe) worn by the object. Alternatively or additionally, the gyroscope may be attached to, or integrated with, jewelry (e.g., a bracelet or watch) worn by the object. The micro-scale nature of the gyroscope may make the gyroscope suitable for many other personal or mobile applications.

In some embodiments, a gyroscope may be embedded in, or included as part of, a navigation system of a motorized moving object, such as a motor vehicle, airplane, boat, submarine, airplane, or spacecraft. In some embodiments, the gyroscope may also be mounted on a propelled object, such as a guided missile (e.g., fleet ballistic missile), and used as part of the guidance system guiding the propelled object in flight.

In some embodiments, one or more control loops may be used to control operation of the gyroscope. The pickoff electrodes may provide signals proportional to the oscillating amplitudes of the principal standing wave (also called the antinodal wave) and the secondary standing wave (also called the nodal-quadrature wave). The principal standing wave may be maintained at a predetermined amplitude using an amplitude control loop. The secondary standing wave may be driven to null using a phase lock loop. The phase lock loop may be a feedback loop, in some embodiments, which may detect and converge on the resonant frequency and phase of the gyroscope. The output of this control loop may be sent to signal processing circuitry, which maintains the correct rate and phase of the nodal and antinodal samplings.

In some embodiments, a rotation sensor is provided that includes a resonator means for creating a vibration pattern, means for increasing the equivalent mass of the resonator means, means for driving the resonator means, and means for sensing an orientation of the vibration pattern. The means for increasing the equivalent mass of the resonator means may include a plurality of masses affixed to suitable locations on the resonator means, such as, for example, along a periphery of the resonator means.

DETAILED DESCRIPTION

A micro-scale gyroscope includes a substrate with pickoff electrodes that are used to sense an azimuth orientation of a vibration pattern of a hemispherical resonator. Although the term gyroscope is used herein, the gyroscope may more generally take the form of a rotation sensor or vibration sensor with a hemispherical resonator. A ring forcer electrode is configured to drive the hemispherical resonator. Voltage may be applied to the forcer electrode to control the amplitude of a standing wave associated with the resonator and to, for example, suppress unwanted quadrature effects. The pickoff electrodes, e.g., capacitor electrodes, may be used to determine the location and amplitude of the standing wave and additionally apply control forces to, for example, suppress unwanted quadrature effects. The capacitance of the pickoff electrodes may be modulated at the resonator flexing frequency. Capacitance changes in the pickoff electrodes may be used to determine rotation rates or rotation angles through rotational-vibrational coupling (e.g., Coriolis coupling) between structural modes of the gyroscope.

The equivalent mass of the hemispherical resonator may be increased by positioning masses around the periphery of the hemispherical resonator. For example, masses may be positioned around the periphery of the hemisphere outer rim. The masses may be made of a heavy metal such as tungsten, gold, platinum, or lead, or any combination thereof. The masses may be positioned at points of maximum deflection or velocity of the resonator. For example, in a resonator using $\cos 2\theta$ vibrational modes, eight masses are distributed at approximately 45 degree increments around the periphery of the hemisphere outer rim. The shape of each mass may be symmetric about a radial vector going out to that mass. For example, circular, square, rectangular, or pie-shaped wedge masses may be used. The weights of the masses may be substantially identical (e.g., within manufacturing tolerances of 0-5%), and/or may depend on several factors, including, for example, expected damping levels and the desired ring down time, $\tau$. The weights of the individual masses may vary about the periphery of the hemisphere with heavier masses located at maximum points of deflection associated with the vibrational modes of the resonator. Lighter masses may be positioned between points of maximum deflection, preferably equally spaced around the periphery of the hemisphere.

Figure 1:
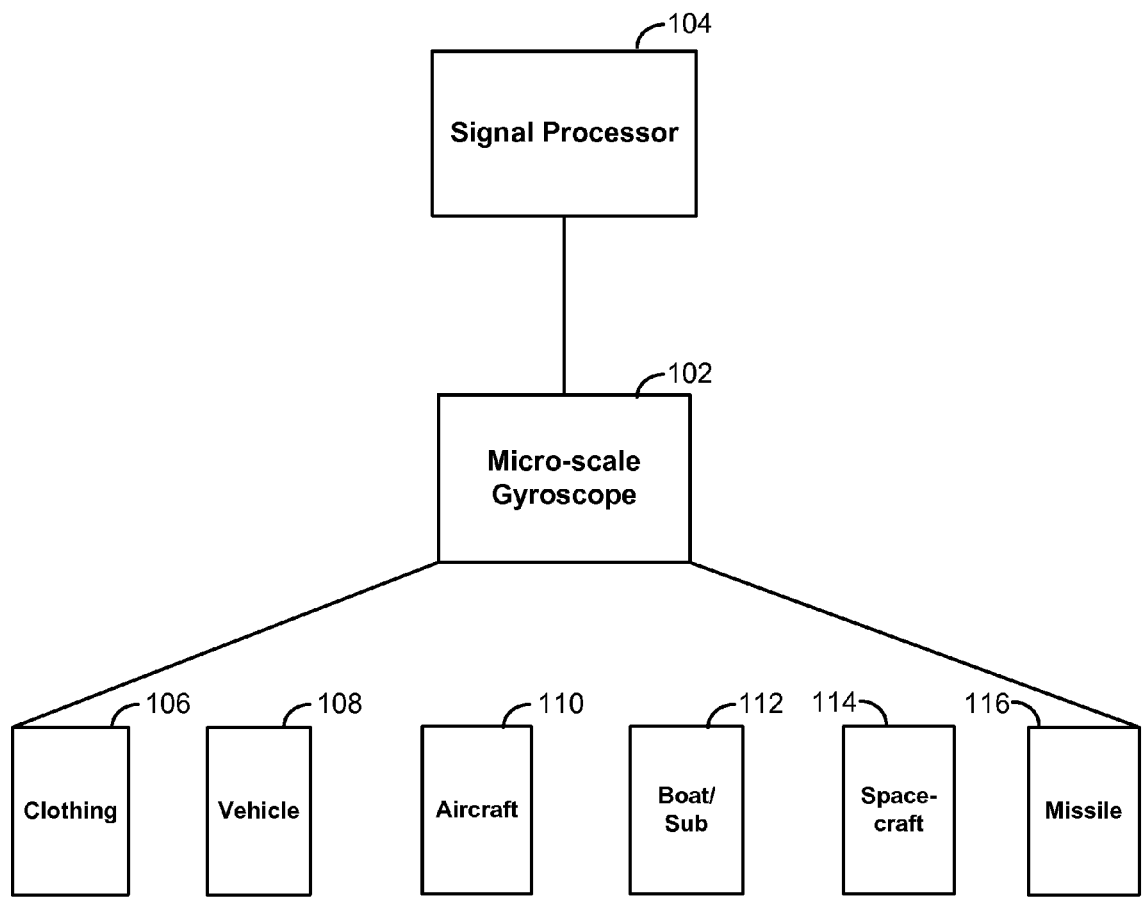
FIG. 1 is a block diagram of a micro-scale gyroscope application system.

FIG. 1 shows an application system 100 that includes a micro-scale gyroscope 102 and a signal processor 104. Due to the micro-scale form factor of gyroscope 102, gyroscope 102 may be used in a wide range of personal and mobile applications. For example, as described in more detail below, in some embodiments gyroscope 102 includes a hemispherical resonator with a 2 mm diameter (or less) and a total form factor of less than 3 mm. In addition to its small form factor, the enhanced ring down time of gyroscope 102 may make gyroscope 102 suitable for applications in limited, restricted, or loss of power environments. For example, gyroscope 102 may be used in military or outdoor applications where power is intermittent, constrained, or not available for limited periods of time. Signal processor 104, which may include signal processing circuitry, such as a digital signal processor (DSP), may be coupled to gyroscope 102. Signal processor 104 may process received measurements from gyroscope 102 on a periodic or continuous basis in order to produce rotation rate or rotation angle measurements. Signal processor 104 may also filter, amplify, enhance, or equalize any of the signals received from gyroscope 102 as well as control the modes of operation of gyroscope 102, as described in more detail below.

Illustrative applications of gyroscope 102 include, as shown, use in clothing 106, motor vehicle 108, aircraft 110, boat or submarine 112, and guided missile 116. Gyroscope 102 may be embedded in, or attached to, clothing 106 associated with an object (e.g., an animal or person). Clothing 106 may take the form of wearable garments including shoes, boots, hats, helmets, gloves, or any other suitable clothing or accessory. Gyroscope 102 may be embedded inside clothing 106 (e.g., within the sole or tongue of a boot or shoe) so as to be permanently or semi-permanently affixed thereto. Clothing 106 may also include jewelry, such as a bracelet or watch. Gyroscope 106 may be attached to the piece of jewelry (e.g., as a functional unit) or embedded therein.

As one example, gyroscope 102 may be embedded in the boot or shoe of one or more military personnel in the field. Gyroscope 102 may be part of a tracking, positioning, or location system, as described in more detail below with regard to FIG. 2. The tracking, positioning, or location system may be used to track or monitor the position, location, or orientation of the military personnel wearing the boot or shoe.

Gyroscope 102 may also be embedded in, or included as part of, a navigation system of a motorized moving object, such as motor vehicle 108, aircraft 110, boat or submarine 112, or spacecraft 114. In some embodiments, gyroscope 102 may also be mounted on a propelled object, such as guided missile 116 (e.g., a fleet ballistic missile), and used as part of the guidance system of the propelled object.

Figure 2:
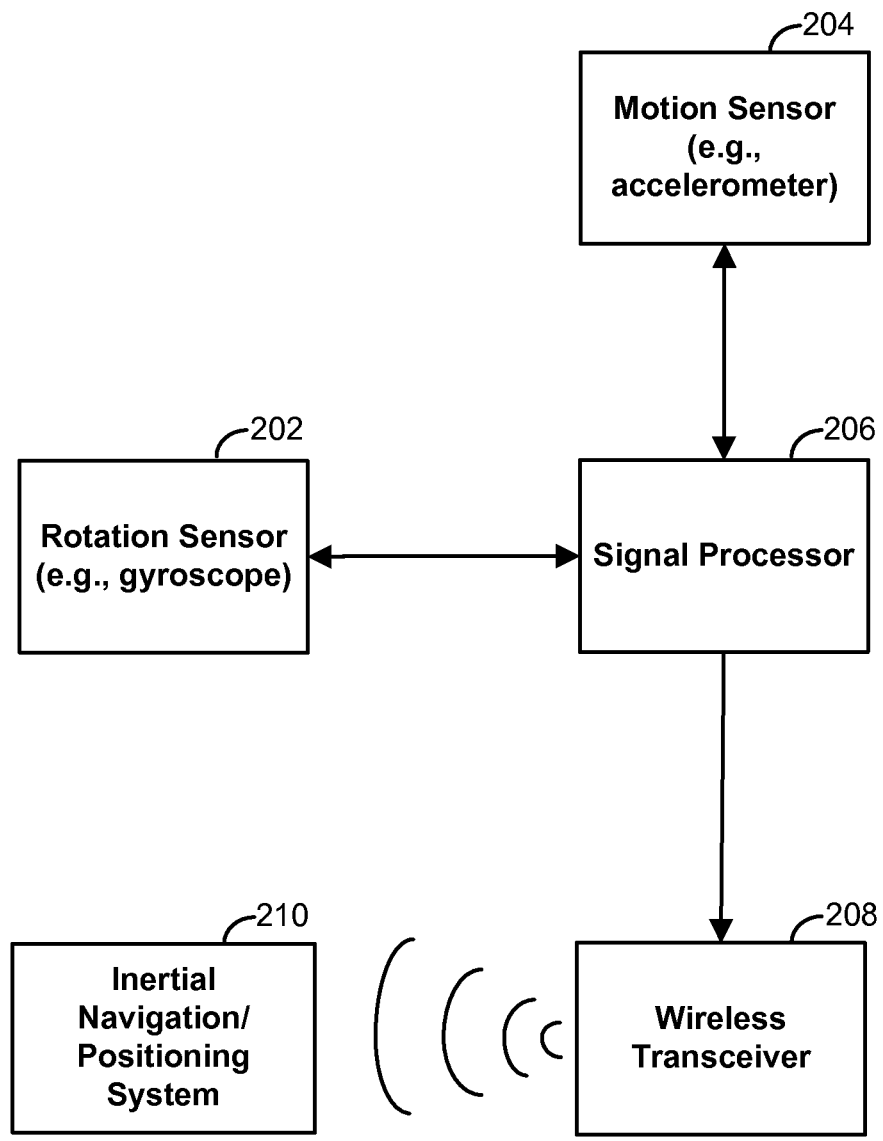
FIG. 2 is a block diagram of a navigation system.

FIG. 2 shows a navigation/positioning system 200 that includes a rotation sensor 202, a motion sensor 204, a signal processor 206, a wireless transceiver 208, and an inertial navigation/positioning system 210. Rotation sensor 202 (e.g., gyroscope 102 of FIG. 1) may measure the rotation rate or rotation angle of an object associated with rotation sensor 202 (e.g., a person, motor vehicle, aircraft, submarine, etc.). An output of rotation sensor 202 may be provided to signal processor 206. Signal processor 206 may include one or more microprocessors, analog-to-digital converters, filers, amplifiers, control logic, and related circuitry for processing the output of gyroscope 202 and may perform any suitable signal processing operation (e.g., filtering, amplification, or equalization) on any of its inputs. Signal processor 206 may be configured to convert one or more outputs of gyroscope 202 into a rotation rate or rotation angle, as described in more detail below.

Signal processor 206 may also receive outputs from one or more instance of motion sensor 204. Motion sensor 204 may include any type of motion detector or sensor, including, for example, a single-axis or multi-axis accelerometer. Signal processor 206 may convert an output of motion sensor 204 into, for example, an acceleration quantity relative to an inertial frame. Signal processor 206 may be in communication with, or electrically coupled to, wireless transceiver 208. Wireless transceiver 208 may wirelessly transmit the rotation and/or motion measurements from rotation sensor 202 and/or motion sensor 204 to inertial navigation/positioning system 210. Inertial navigation/positioning system 210 may determine, for example, the location, direction (e.g., orientation), and velocity of an object associated with rotation sensor 202 and/or motion sensor 204. For example, inertial navigation/positioning system 210 may determine the location, direction, and velocity of one or more of a person associated with clothing 106 (FIG. 1), vehicle 108 (FIG. 1), aircraft 110 (FIG. 1), boat or submarine 112 (FIG. 1), spacecraft 114 (FIG. 1), and missile 116 (FIG. 1).

Signal processor 206 may also control the operation of rotation sensor 202, motion sensor 204, or both. For example, signal processor 206 may determine the frequency of measurements and the duration and modes of operation of rotation sensor 202, motion sensor 204, or both. Signal processor 206 may query one or more of rotation sensor 202 and motion sensor 204 for updated measurements periodically (e.g., on a regular schedule, for example, every second) continuously, or after some predefined event (e.g., supporting event-driven inquiries).

Figure 3:
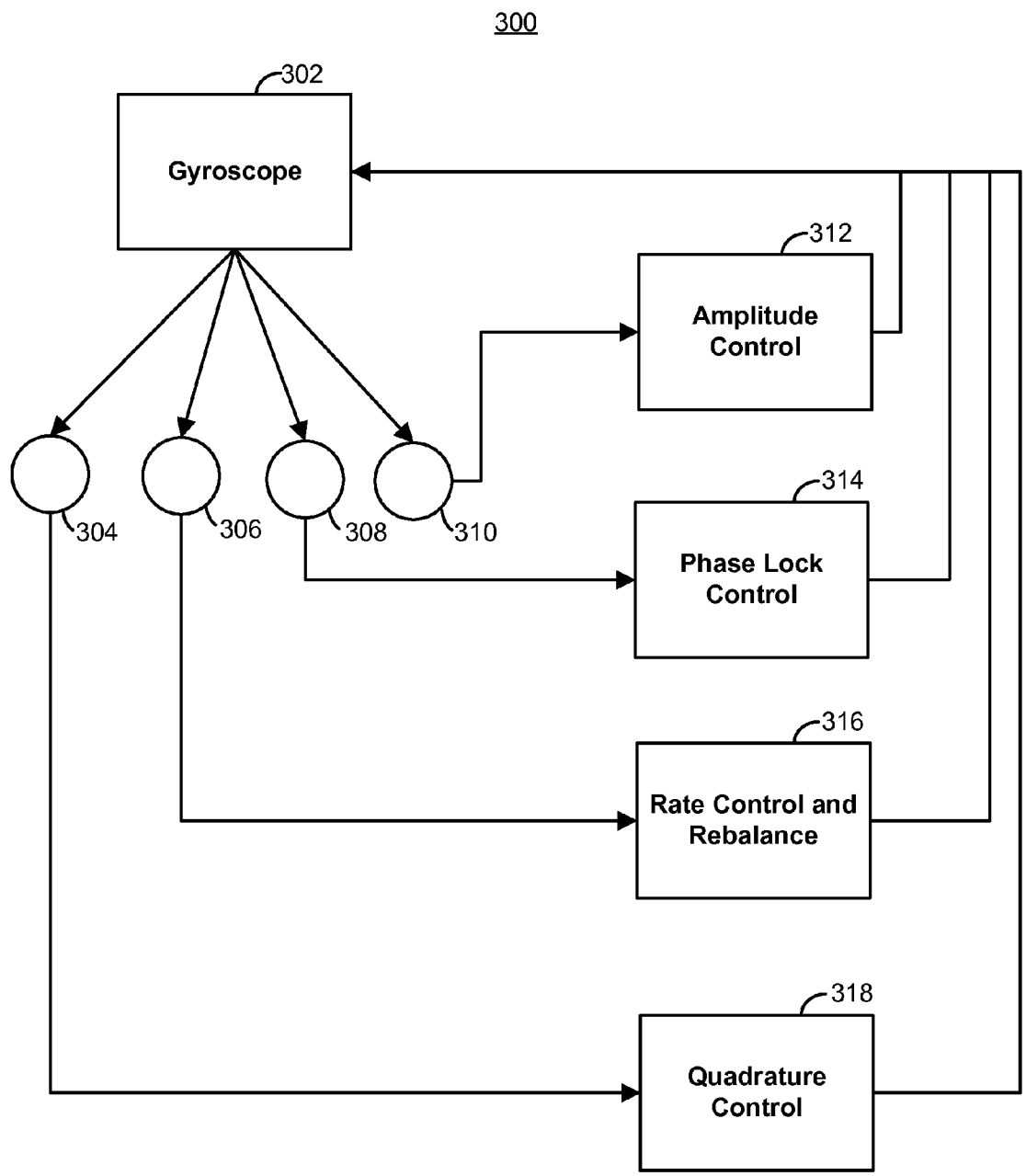
FIG. 3 is a block diagram of control loops for controlling a gyroscope.

FIG. 3 shows control loops 300 used to control operation of gyroscope 302. The small amplitudes of shell deformation of a resonator associated with gyroscope 302 may correspond to a principal standing wave and a secondary standing wave. When the principal standing wave and secondary standing wave are in phase (and in the special case in which they are of equal amplitude), the result of superposing the principal standing wave and secondary standing wave is a similar standing wave whose lobes (e.g., antinodes) and nodes are midway between the antinodes and nodes of the principal standing wave and secondary standing wave.

To control gyroscope 302, one of the standing waves may be maintained (e.g., either the principal standing wave or the antinodal wave) at a prescribed amplitude. The other wave (e.g., the secondary standing wave or nodal-quadrature wave) may be driven to null. In rebalance mode, additional forces may be developed to maintain the standing wave in a fixed location. To implement control loops 300, the outputs of the pickoff electrodes associated with gyroscope 302 are processed to provide signals proportional to the oscillating amplitudes of the principal (antinodal) standing wave and the nodal-quadrature wave. In a rebalance operation, the readout signals may provide the desired signals because the pickoff electrodes may be positioned directly over the antinodes and nodes of the antinodal and nodal-quadrature waves in some embodiments.

The antinodal and nodal-quadrature signals may be demodulated with respect to the signals from a reference oscillator to provide outputs that are proportional to their oscillatory components that are in phase (e.g., antinodal cosine output 310 and nodal cosine output 306) and in quadrature (antinodal sine output 308 and nodal sine output 304) with the reference oscillator. The frequency and phase of the reference oscillator may be controlled by a phase lock loop that adjusts the frequency and phase of the reference oscillator so as to drive antinodal sine output 308 to zero. Driving antinodal sine output 308 to zero may lock the reference oscillator to the frequency and phase of the principal (e.g., antinodal) wave. Antinodal cosine output 310 may then provide a measure of the amplitude of the principal standing wave and may be used as the control variable by amplitude control logic 312 used to maintain the amplitude at a prescribed value.

Phase lock control logic 314 may maintain the phase of the reference oscillator equal to the phase of the antinodal wave. Nodal sine output 304 may be proportional to the amplitude of the nodal quadrature wave. Nodal sine output 304 may therefore be used as the control variable in the closed loop that drives the amplitude of the nodal-quadrature wave to null (e.g., using quadrature control logic 318), thus ensuring that the principal wave is a pure standing wave.

A rebalance operation may be performed (e.g., using rate control and rebalance logic 316) by exerting forces of the correct phase at the standing wave nodes so as to null or zero out nodal cosine output 306. The amplitude of the force required is related to the rotation rate of gyroscope 302 that is attempting to rotate the standing wave and thus create a nonzero nodal cosine output 306. As mentioned earlier, during a rebalance operation, the pickoff electrodes may define the location of the antinodes and nodes of the two waves and therefore the demodulated electrode outputs can be used directly as the control variables in the various loops.

The phase lock loop controlled by phase lock control logic 314 may be a feedback loop, which detects and converges on the unique resonant frequency and phase of gyroscope 302. The output of this control loop may generate a specific frequency control to digital signal processing (e.g., signal processor 206 (FIG. 2) or signal processor 104 (FIG. 1)), which maintains the correct rate and phase of the nodal and antinodal samplings.

Figure 4:
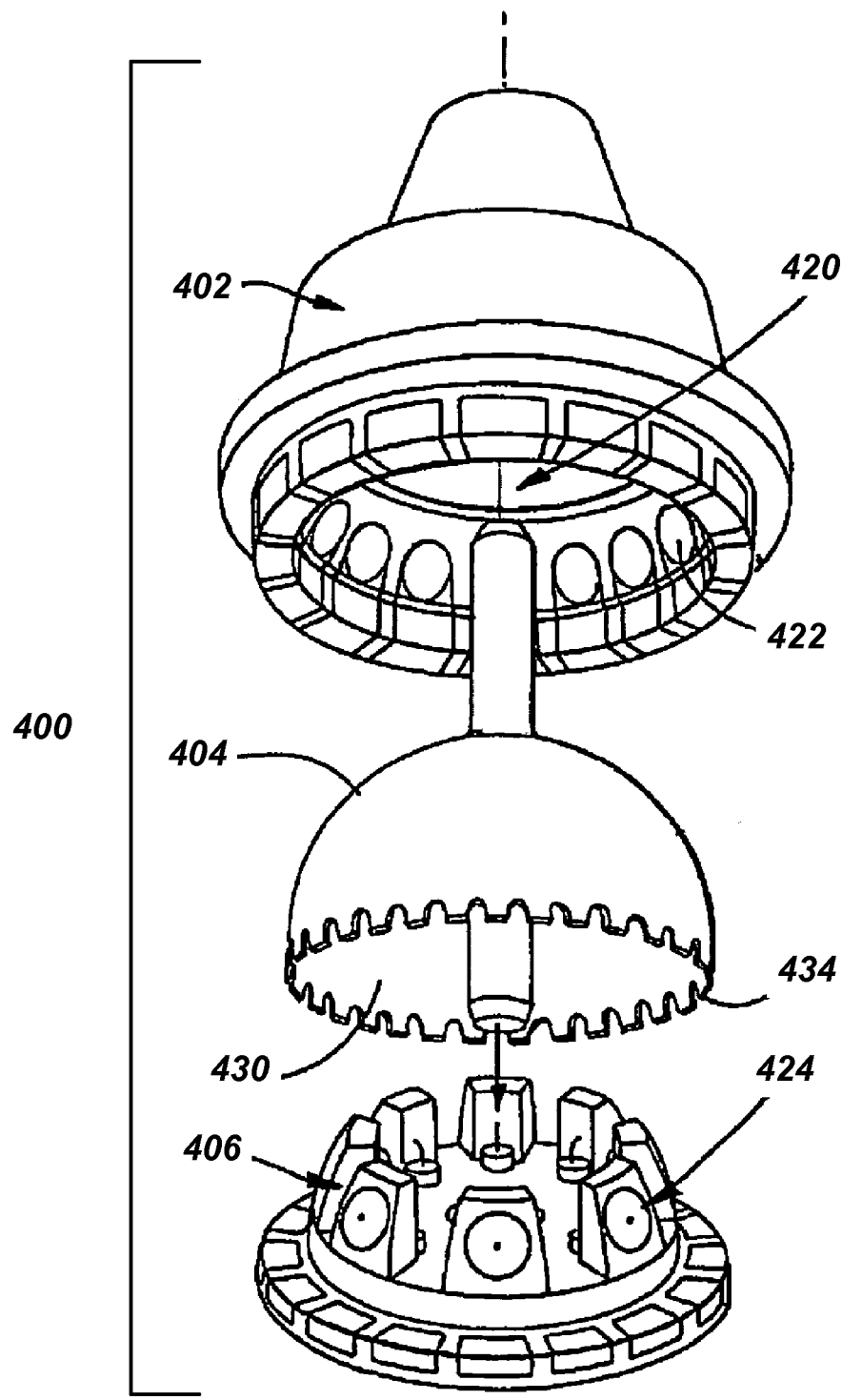
FIG. 4 is an exploded perspective view of a gyroscope.

FIG. 4 shows a gyroscope 400 including a housing 402, a resonator 404, and pickoff electrodes 406. Gyroscope 400 may include a number of electrodes 422 that are metalized on the inside surface of the outer housing 402, which may be concentric with hemispherical shell resonator 404. Electrodes 422 in the outer housing 402 together with the surface of hemispherical shell resonator 404 form a series of forcing electrostatic capacitors. Voltage may be applied to combinations of electrodes 422 to control the amplitude of the standing wave and to suppress unwanted quadrature effects.

Gyroscope 400 may be rotated about an axis normal to the plane of rim 434 of hemispherical shell resonator 404. This rotation causes the standing wave to rotate in the opposite direction with respect to the gyroscope 400 by an angle proportional to the angle of rotation of gyroscope 400. Thus, by measuring the angle of rotation of the standing wave with respect to gyroscope 400, the angle of rotation of gyroscope 400 may be determined.

The vibrational mode of hemispherical shell resonator 404 may be excited by placing a DC bias voltage on the resonator and an AC voltage on forcing ring electrode 420. The frequency of the AC voltage may be twice the resonant frequency of hemispherical shell resonator 404 in some embodiments.

Signals from gyroscope 400 contain information about the amplitude and location of the standing wave on the hemispherical shell resonator 404. These signals may be obtained capacitively. Pickoff electrodes 406 and 424 may be formed by metalized interior surface 430 of hemispherical shell resonator 404 and may be located on an inner concentric housing held in close proximity to the inner metalized shell of hemispherical shell resonator 404. Because of the shell's oscillating deformation, the capacitance of each of the pickoff electrodes 406 and 424 may be modulated at the resonator flexing frequency. Electronic circuits, for example, may be used to measure these capacitance changes from which the location and amplitude of the standing wave may be determined.

Figure 5:
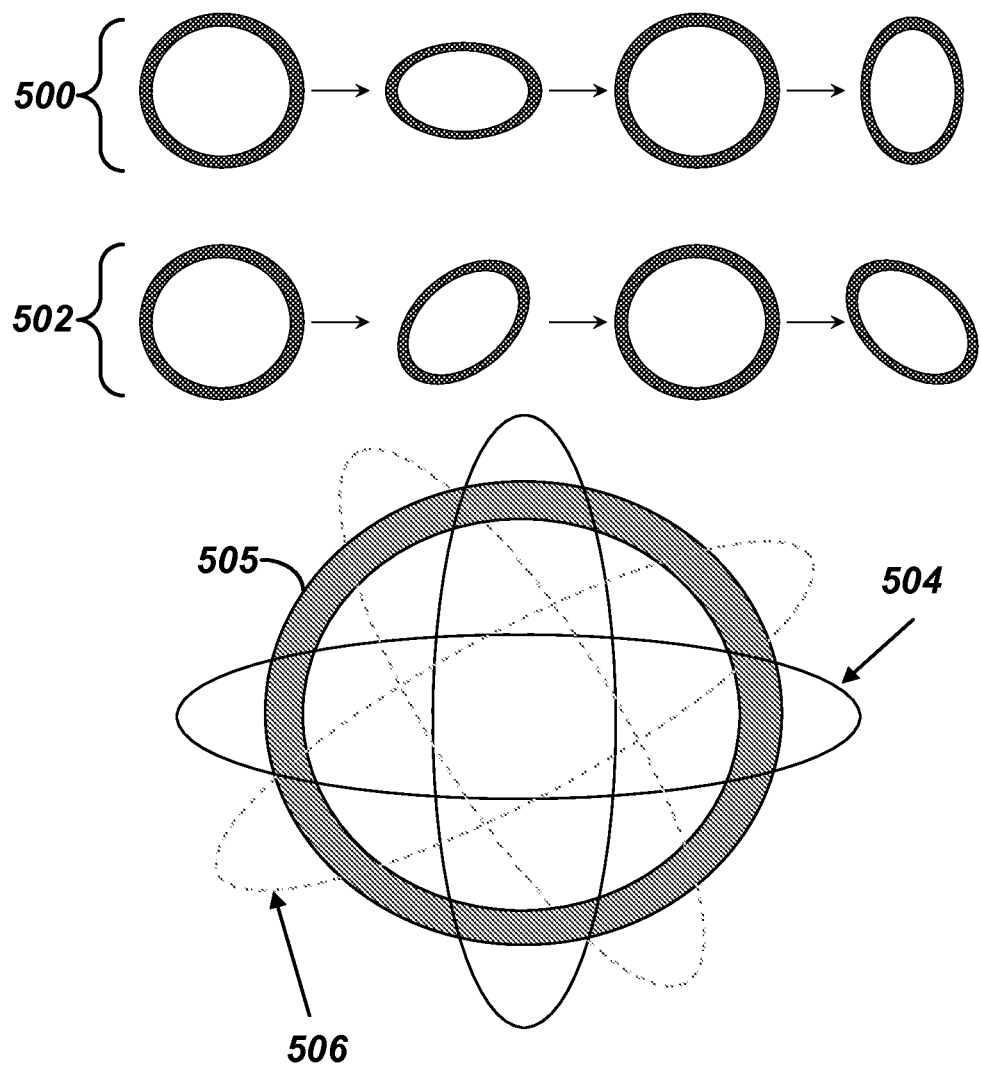
FIG. 5 shows illustrative oscillation modes of the gyroscope shown in FIG. 4.

FIG. 5 shows views of structural modes 500 and 502 from the hemisphere rim of gyroscope 400 of FIG. 4. Generally, the hemispherical resonator of a hemispherical resonator gyroscope has two structural modes that comprise the primary modes of operation of the gyroscope. The two structural modes may correspond to structural modes 500 and 502. The hemispherical resonator may be initially driven into a primary oscillation pattern as shown in structural mode 500. Rotation induced Coriolis force may cause precession of the primary oscillation pattern into structural mode 502. The precession may be proportional, for example, to the rate and angle of rotation. Initial vibratory oscillation pattern 504 and precessed oscillation pattern 506 corresponding to structural modes 500 and 502 are shown overlaid on hemisphere rim 505.

Figure 6A:
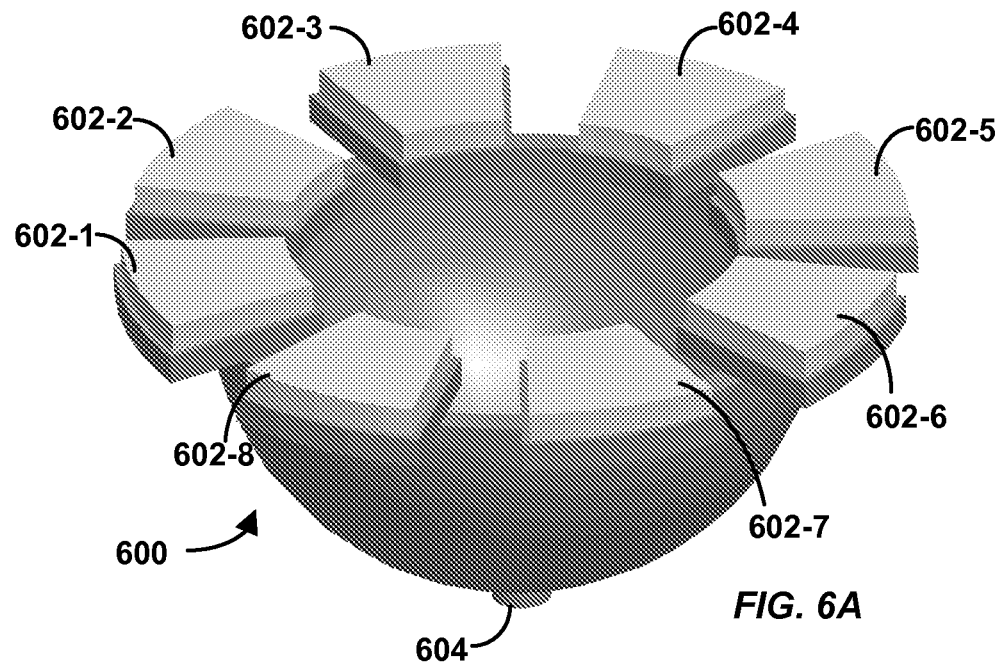
FIGS. 6A-6B are a perspective view and a top view, respectively, of a hemispherical resonator with pie-shaped masses distributed along a periphery of a rim of the resonator.
Figure 6B:
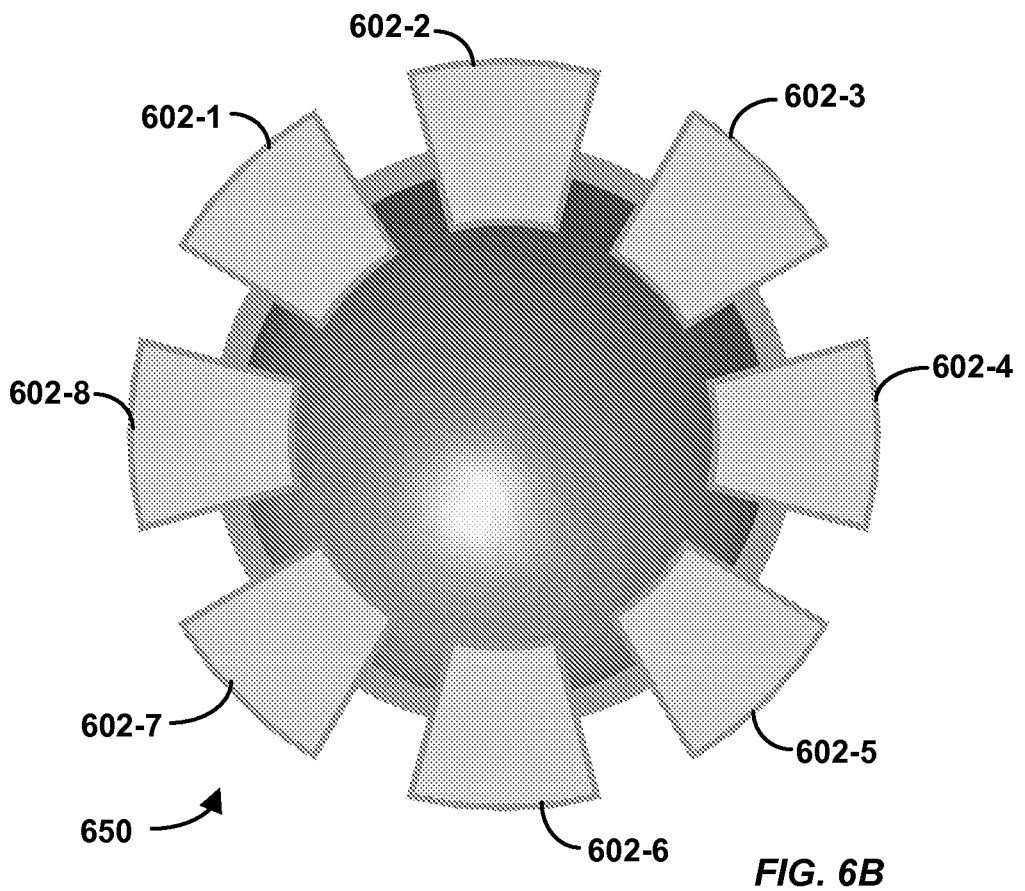

FIGS. 6A-6B show a hemispherical resonator 600. Hemispherical resonator 600 may be supported by stem 604 and may replace hemispherical shell resonator 404 (FIG. 4) of gyroscope 400 (FIG. 4) in some embodiments. Hemispherical resonator 600 may be fabricated, for example, using micromachining compatible processes such as, for example, atomic layer deposition of oxide. Distributed masses 602 may be positioned on the rim of hemispherical resonator 600 in order to increase the resonator's equivalent mass. In some embodiments, distributed masses 602 may be made of any heavy material (e.g., a heavy metal) conducive to micro-scale fabrication, such as, for example, gold, platinum, tungsten, lead, or any combination thereof. The use of a heavy metal for distributed masses 602 may optimize the mass increase given a confined geometric form factor of the gyroscope. In some embodiments, distributed masses 602 may be fabricated using electroplating.

By increasing the equivalent mass of hemispherical resonator 600, the ring down time, $\tau$, of gyroscope 400 may also be increased. The ring down time may be considered the amplitude decay constant of hemispherical resonator 600 if all external forces are removed and hemispherical resonator 600 is allowed to freely oscillate. The ring down time may also quantify the amount of effort required to maintain the oscillation pattern of the hemisphere, where a hemisphere with a larger ring down time requires less effort. The ring down time is proportional to the equivalent mass (m) and damping coefficient (b) of hemispherical resonator 600, where $\tau = 2$ m/b.

Figure 6C:
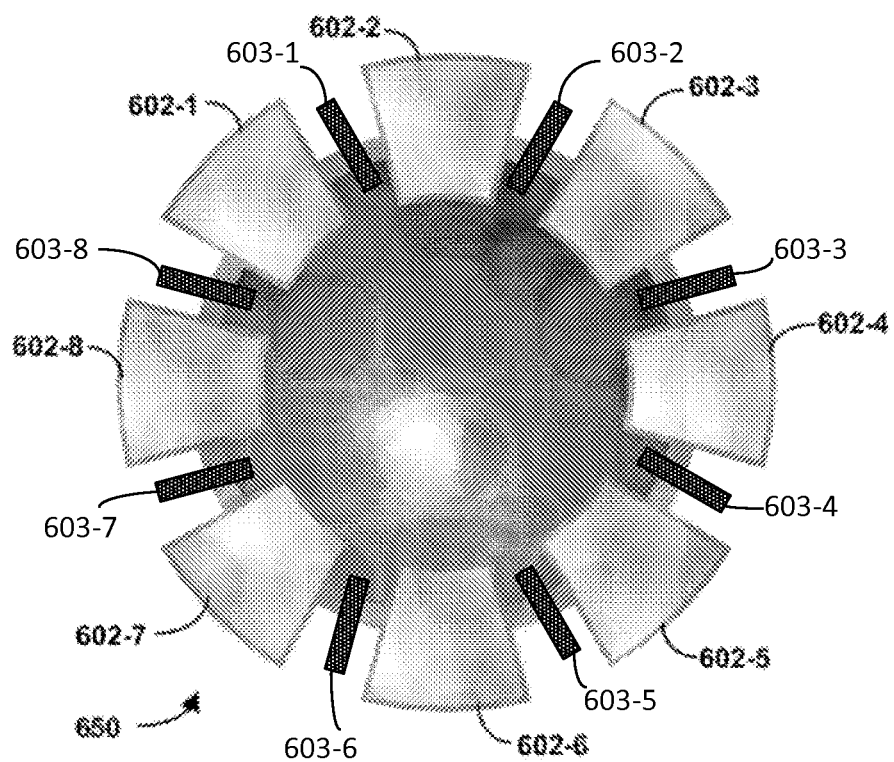
FIG. 6C is a top view of a hemispherical resonator with pie-shaped masses distributed along a periphery of a rim of the resonator, and rectangular-shaped weights of a lighter mass than that of, and distributed between, the pie-shaped masses.

Distributed masses 602 may be positioned around the periphery of the outer rim of hemispherical resonator 600. The masses may be positioned at points of maximum deflection or velocity of the resonator. For example, in some embodiments, in a resonator using the cos $2\theta$ vibrational modes, eight masses are distributed at approximately 45 degree increments around the periphery of the outer rim of hemispherical resonator 600. More or fewer masses may be positioned around the periphery of the outer rim of hemispherical resonator 600 in other embodiments. In some embodiments, the shape of each mass may take any shape that is symmetric about the radial vector going out to that mass. For example, circular, square, rectangular, or pie-shaped wedge masses may be used. The weight of the masses may be substantially identical in some embodiments, and may depend on several factors, including, for example, expected damping levels and the desired ring down time, $\tau$. In other embodiments, the weights of the masses may vary about the periphery of the hemisphere with heavier masses located at maximum points of deflection associated with the vibrational modes of the resonator. Lighter masses may be positioned between points of maximum deflection, equally spaced around the periphery of the hemisphere. For example, FIG. 6C is a top view diagram of the hemispherical resonator 600 that includes the masses 602-1 to 602-8 distributed at the points of maximum deflection, and further includes lighter rectangular-shaped masses 603-1 to 603-8 positioned between the points of maximum deflection.

FIG. 6B is a top view of hemispherical resonator 650 that shows eight distributed masses 602 spaced equally around the outer rim of hemispherical resonator 650. As mentioned above, more or fewer masses may be positioned around the periphery of the outer rim of hemispherical resonator 600 in other embodiments. The actual number of masses selected for distribution on hemispherical resonator 650 may be based, at least in part, on the vibrational modes used to drive hemispherical resonator 650. As mentioned above, if the two cos $2\theta$ vibrational modes are used, then eight masses may be positioned at points of maximum deflection of hemispherical resonator 650. If higher order vibrational modes are used to drive hemispherical resonator 650, then a greater number of masses may be positioned around the periphery of the outer rim of hemispherical resonator 650. For example, 10, 12, 16, 18, 24, or more masses may be positioned around the periphery of the outer rim of hemispherical resonator 650 in some embodiments.

Figure 7A:
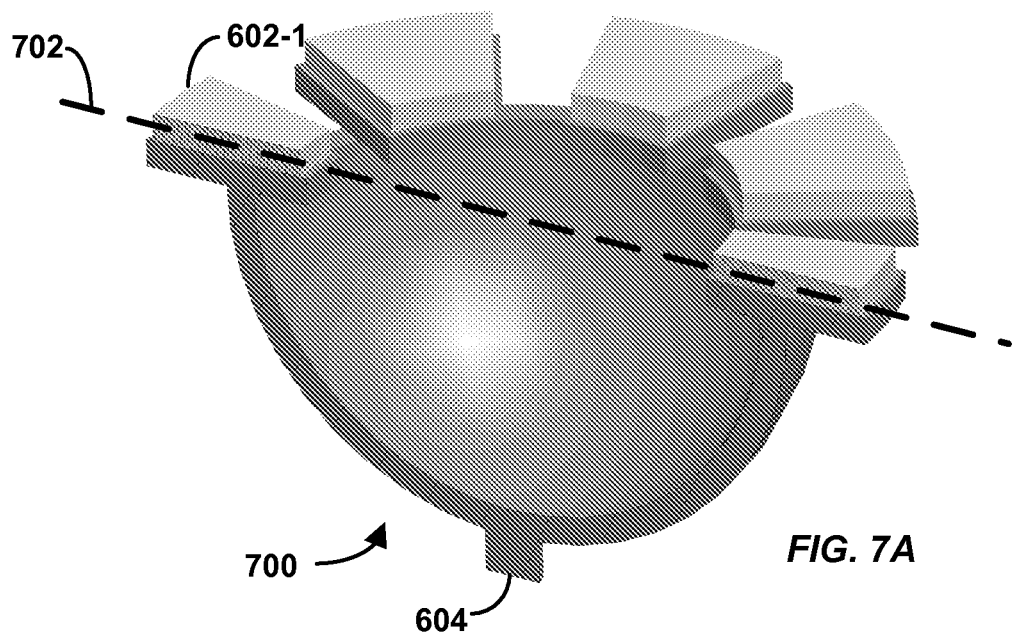
FIGS. 7A-7B are a perspective view and a side view of a cross-section of the illustrative resonator of FIGS. 6A-6B.
Figure 7B:
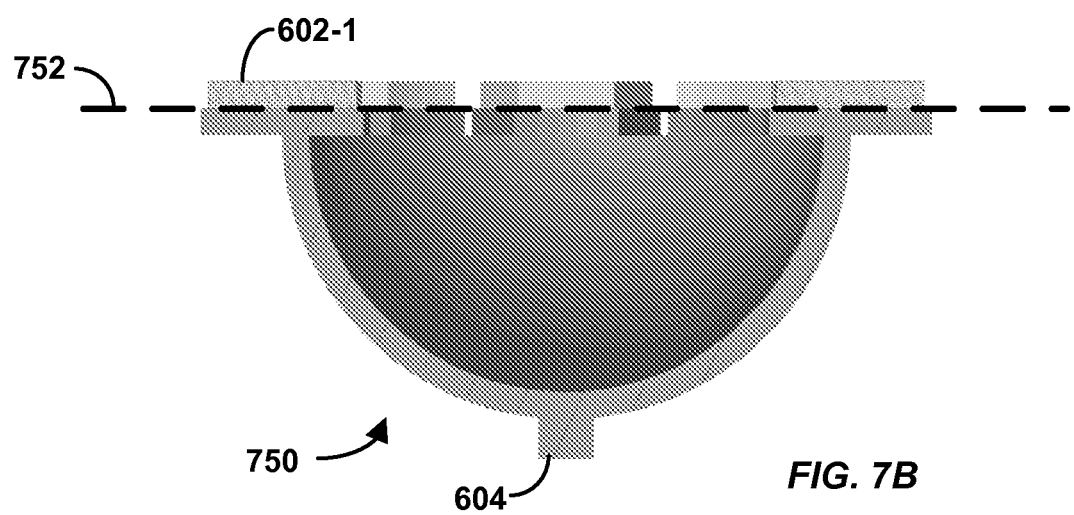

FIGS. 7A-7B show a half 700 of hemispherical resonator 600. As shown in half 700, the shape of mass 602-1 may be symmetric about radial vector 702 going out to that mass. Although pie-shaped wedges are shown in the example of FIG. 7, other shapes may be used for the masses, including circular, square, or rectangular masses. In cross-sectional side view of hemispherical resonator 750, mass 602-1 can be seen affixed to the outer rim of hemispherical resonator 750 on plane 752. Mass 602-1, like the other masses affixed to the outer rim of hemispherical resonator 750, may be affixed using any suitable technique. For example, as described in connection with FIGS. 8A-8B and 9, below, the masses may be patterned using electroforming of a heavy metal, such as gold, platinum, tungsten, or lead.

Figure 8A:
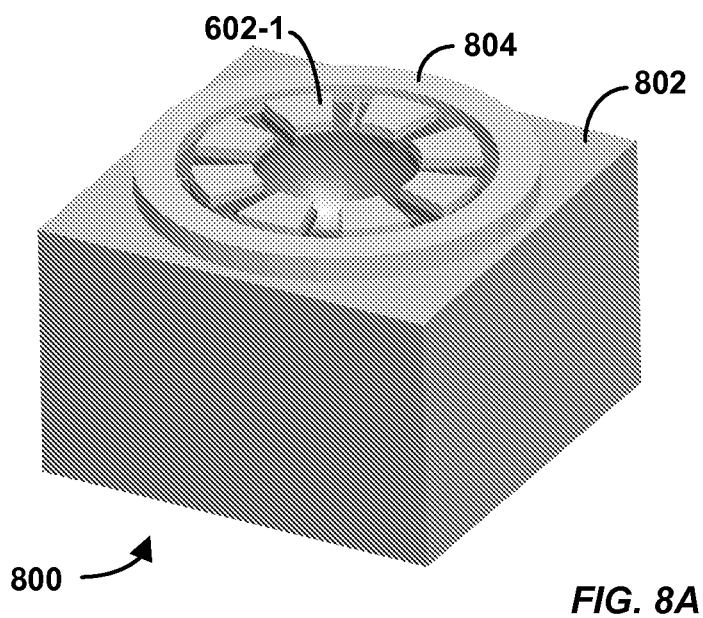
FIGS. 8A-8B are a perspective view and a perspective cross-sectional view of a gyroscope assembly used in manufacturing the gyroscope shown in FIG. 4.
Figure 8B:
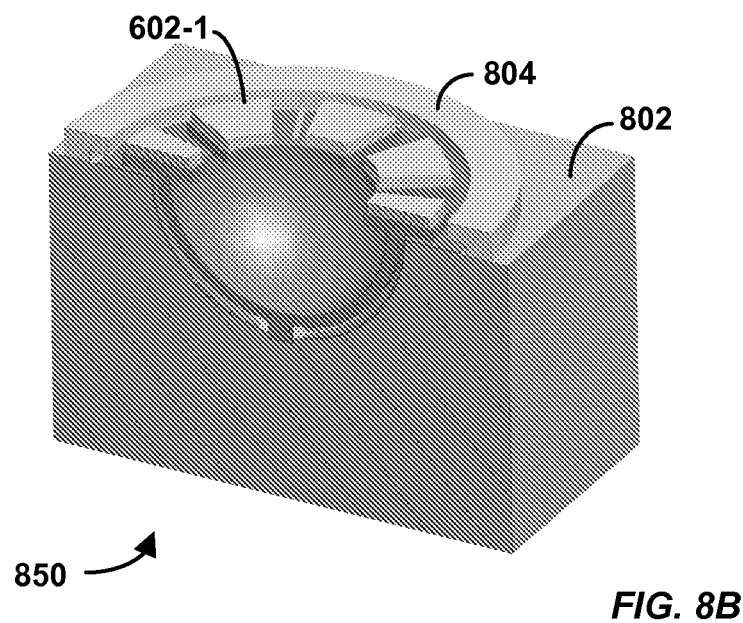

FIGS. 8A-8B show a hemispherical resonator gyroscope assembly 800 used in manufacturing gyroscope 600. Hemispherical resonator gyroscope assemblies 800 and 850 include a hemisphere manufactured using a atomic layer deposition of a thin film oxide into micro-mold 802, where the mold may become eventually become part of the entire assembly. Prior to the deposition of the oxide, metal electrodes are deposited and patterned to form pickoff electrodes. After the electrodes are deposited, a sacrificial layer is deposited to define the gap between the hemisphere and the electrodes. The hemisphere is then formed using atomic layer deposition of, for example, a thin film oxide or nitride with a thin film metal deposited at the midplane of the hemisphere to provide electrical contact used in the electrostatic transduction of the hemisphere. After the deposition of the hemisphere, masses 602 may then be added using electroforming of a heavy metal, such as gold, platinum, tungsten, or lead. In addition to creating the masses, the electroforming may also simultaneously add forcer ring 804 about the periphery of the hemisphere to provide the electrostatic forces for driving the structure. Following the electroforming process, the sacrificial layer may be released to form a free-standing hemisphere connected to the substrate via a stem (e.g., stem 604 of FIG. 6) located at the base of the hemisphere.

Figure 9:
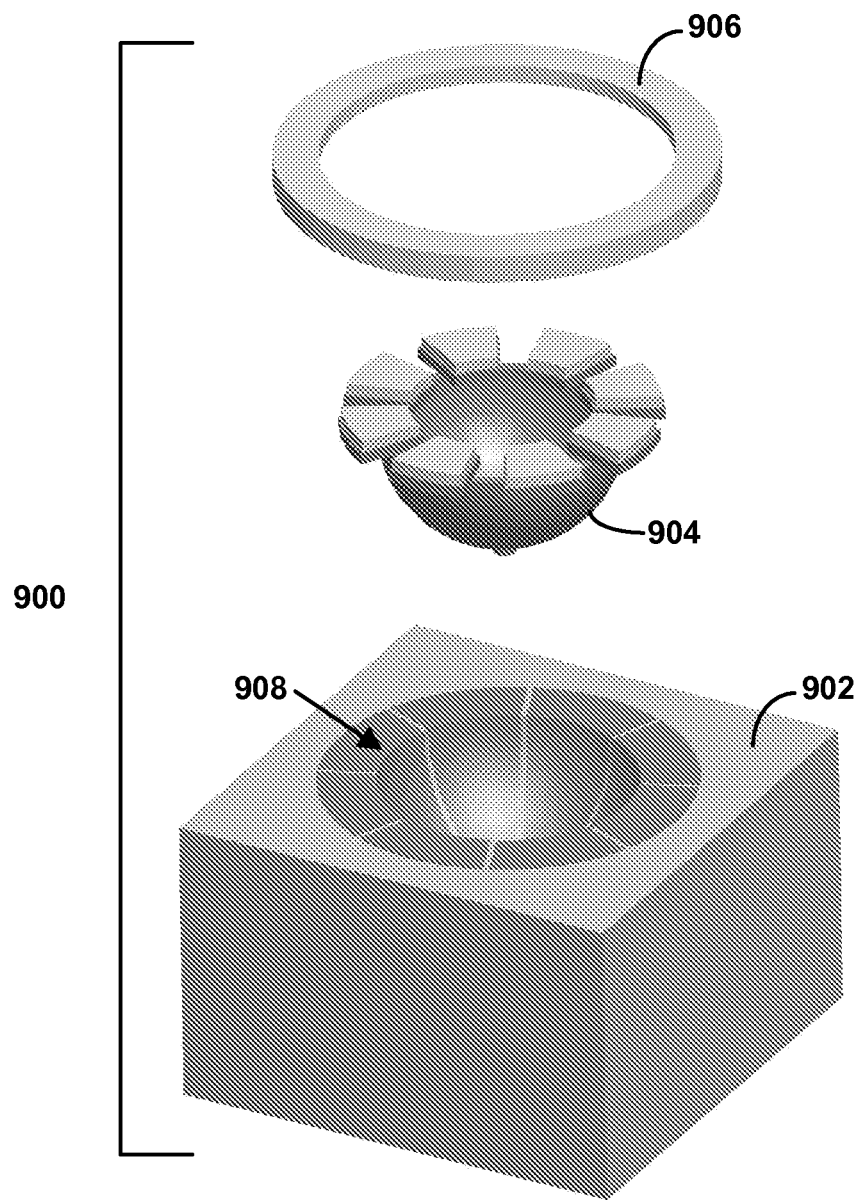
FIG. 9 is an exploded perspective view of the mold shown in FIGS. 8A-8B.

FIG. 9 shows an assembly 900 of a hemispherical resonator gyroscope. Assembly 900 may include substrate 902, which may be composed of silicon. A mold may be created using isotropic etching of substrate 902. Metal electrodes 908 may then be patterned to serve as the pickoff electrodes. Although eight electrodes 908 are shown in the example of assembly 900, more or fewer electrodes may be included in actual implementations (e.g., 12 or 16 electrodes). The hemispherical resonator 904 may be formed using layered deposition on a sacrificial release layer. The heavy metal masses are then patterned on the hemispherical resonator. Forcer electrode 906 may be formed simultaneously with the masses using an electroforming technique and may serve to drive hemispherical resonator 904. Although electrostatic actuation (e.g., to excite and drive the gyroscope oscillator) is used in some embodiments, other actuation techniques, such as piezoelectric, magnetic, thermal, or optical actuation may be used in other embodiments. In such cases, a piezoelectric, magnetic, thermal, or optical actuator may replace forcer electrode 906. In addition, although capacitive sensing or detection mechanisms may be used in some embodiments, other forms of sensing or detection (such as piezoelectric, piezoresistive, optical, or magnetic sensing) may be used in other embodiments in which case metal electrodes 908 may be replaced by a suitable piezoelectric, piezoresistive, optical, or magnetic sensing element or sensor.

Figure 10:
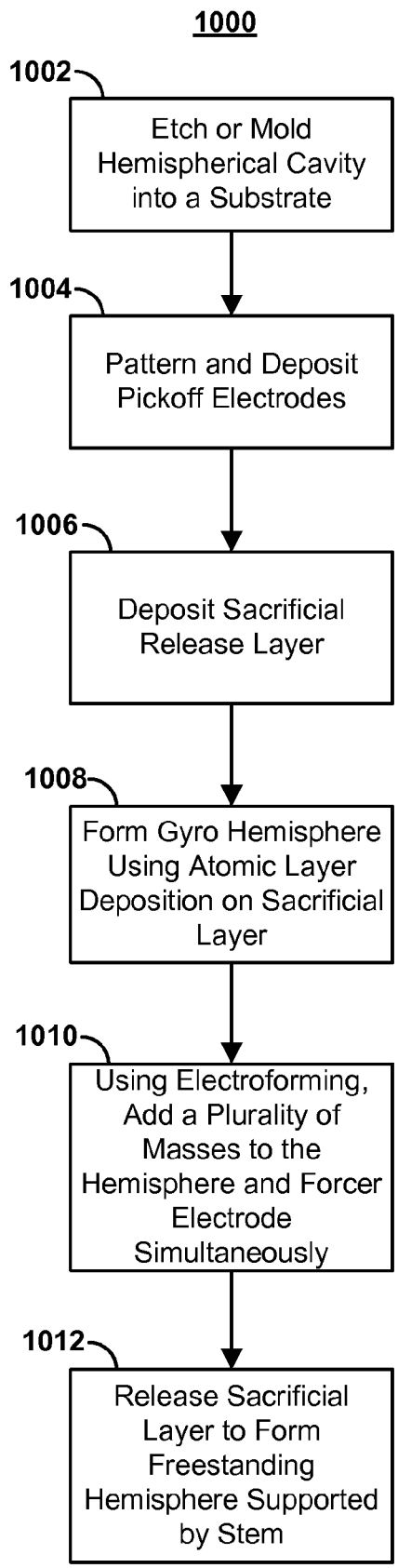
FIG. 10 is a block flow diagram of a process for manufacturing the gyroscope shown in FIG. 4.

Referring to FIG. 10, with further reference to FIGS. 1-9, a process 1000 of making gyroscope 400 includes the stages shown. The process 1000 is, however, an example only and not limiting. The process 1000 can be altered, e.g., by having stages added, removed, rearranged, combined, and/or performed concurrently either partially or completely.

At step 1002, a hemispherical cavity is etched or molded into a substrate. For example, the substrate may be composed of silicon in some embodiments. At step 1004, pickoff electrodes are pattered and deposited. For example, the pickoff electrodes may be patterned and deposited on substrate 902 (FIG. 9). At step 1006, a sacrificial release layer may be deposited so as to define the gap between a hemispherical resonator (which will be formed at step 1008) and the electrodes. At step 1008, the hemispherical resonator may be formed using atomic layer deposition on the sacrificial release layer which was deposited at step 1006. At step 1010, using an electroforming process, a plurality of masses may be added to the rim of the hemispherical resonator. During the same electroforming process, a forcer ring electrode may be simultaneously formed with the plurality of masses using a single electroforming step. At step 1012, the sacrificial layer may be released to form a free-standing hemispherical resonator supported by a stem.

Although process 1000 describes one technique for creating gyroscope 400, many other techniques may be used as well. For example, in some embodiments, micro-molding may be used in place of, or in addition to, the atomic later deposition described above. As another example, a wet or dry etching process may be used in place of, or in addition to, the atomic later deposition described above. Other suitable manufacturing processes may also be used.

Figure 11:
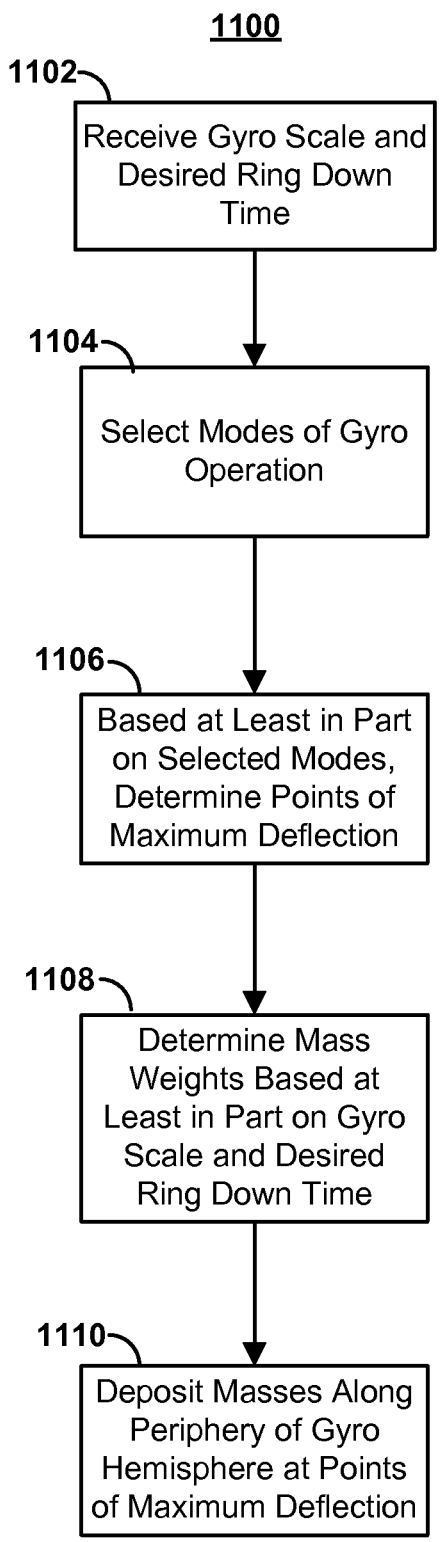
FIG. 11 is a block flow diagram of a process for distributing masses along the rim of the resonator shown in FIGS. 6A-6B.

Referring to FIG. 11, with further reference to FIGS. 1-9, a process 1100 of depositing masses on resonator 600 includes the stages shown. The process 1100 is, however, an example only and not limiting. The process 1100 can be altered, e.g., by having stages added, removed, rearranged, combined, and/or performed concurrently either partially or completely.

At step 1102, a desired gyroscope scale and desired ring down time are received. For example, specifications referencing a micro-scale gyroscope with a 2 mm resonator diameter and a ring down time of 500 seconds may be received. Based at least in part on the received specifications, modes of operation of the gyroscope may be selected at step 1104. For example, as described above, the most commonly used vibrational modes in a hemispherical resonator of a gyroscope are the two cos 2θ modes. Higher or lower order modes may also be selected at step 1104. At step 1106, points of maximum resonator deflection are determined based, at least in part, on the selected vibrational modes. For example, using the cos 2θ modes mentioned above, there are eight points of maximum deflection with each point separate by approximately 45 degrees around the peripheral of the resonator. At step 1108, weights for masses to be positioned at the points of maximum deflection are computed based, at least in part, on the desired ring down time.

For example, as described above, the ring down time of a gyroscope may be increased by increasing the equivalent mass of the resonator of the gyroscope. The ring down time may be considered the amplitude decay constant of the hemisphere of the gyroscope if all external forces are removed and the hemisphere is allowed to freely oscillate. The ring down time may also quantify the amount of effort required to maintain the oscillation pattern of the hemisphere, where a hemisphere with a larger ring down time requires less effort. The ring down time, $\tau$, is proportional to the equivalent mass (m) and damping coefficient (b) of the hemisphere where $\tau = 2 m/b$.

At step 1110, the masses are deposited along the periphery of the resonator of the gyroscope in order to increase the equivalent mass of the resonator. The masses may be positioned at points of maximum deflection or velocity of the resonator. For example, as shown in the example of FIG. 6, eight masses may be positioned along the outer rim of the resonator 600 (FIG. 6) approximately 45 degrees apart from one another. This positioning may correspond to the eight points of maximum deflection of the resonator using the two cos 2θ modes mentioned above. The eight points of maximum deflection of the resonator may result from initial vibratory oscillation pattern 504 (FIG. 5) and precessed oscillation pattern 506 (FIG. 5) corresponding to structural modes 500 (FIG. 5) and 502 (FIG. 5). More or fewer masses may be positioned on the resonator in other embodiments.

In some embodiments, the shape of each mass may take any shape that is symmetric about the radial vector going out to that mass. For example, circular, square, rectangular, or pie-shaped wedge masses may be used. The weights of the masses may be substantially identical in some embodiments, and may depend on several factors, including, for example, expected damping levels and the desired ring down time, τ. In other embodiments, the weights of the individual masses may vary about the periphery of the hemisphere with heavier masses located at maximum points of deflection associated with the vibrational modes of the resonator. Lighter masses may be positioned between points of maximum deflection, equally spaced around the periphery of the hemisphere.

Various modifications, alternative constructions, and equivalents may be used without departing from the scope of the disclosure. For example, one or more elements described above may be a component of a larger system, wherein other rules may take precedence over or otherwise modify the application of the particular example or element. Also, a number of steps may be undertaken before, during, or after the above elements are considered. Accordingly, the above description does not limit the scope of the disclosure, including the appended claims, to the examples provided.

What is claimed is:

1. A rotation sensor comprising:
a hemispherical resonator comprising a plurality of masses electroformed affixed along a planar surface of a periphery of the hemispherical resonator's outer rim;
a ring forcer electrode in communication with the hemispherical resonator and configured to drive the hemispherical resonator; and
a plurality of electrodes disposed in proximity to the hemispherical resonator and configured to sense an orientation of a vibration pattern of the hemispherical resonator.

2. The rotation sensor of claim 1 wherein the plurality of masses are equally spaced around the outer rim of the hemispherical resonator.

3. The rotation sensor of claim 1 wherein the plurality of masses are composed of a heavy metal selected from the group consisting of gold, platinum, tungsten, and lead.

4. The rotation sensor of claim 1 wherein the plurality of masses are positioned at points of maximum deflection of the vibrating hemispherical resonator.

5. The rotation sensor of claim 4 wherein the points of maximum deflection are based, at least in part, on at least one vibrational mode of the hemispherical resonator.

6. The rotation sensor of claim 5 wherein:
the at least one vibrational mode of the hemispherical resonator comprises a cos 2θ vibrational mode; and
the plurality of masses comprise eight masses positioned at 45 degree increments around the rim of the hemispherical resonator.

7. The rotation sensor of claim 5 wherein the hemispherical resonator has a diameter of 2 mm or less and a ring down time of 500 seconds or longer.

8. The rotation sensor of claim 1 wherein each of the plurality of masses is symmetric about a radial vector going out to each mass.

9. The rotation sensor of claim 8 wherein each of the plurality of masses is wedge shaped.

10. The rotation sensor of claim 1 wherein each of the plurality of masses has a substantially identical weight.

11. The rotation sensor of claim 1 wherein:
the plurality of masses have different weights;
heavier masses are positioned at points of maximum deflection of the hemispherical resonator; and
lighter masses are positioned between the points of maximum deflection.

12. A rotation sensor comprising:
a hemispherical resonator including a first equivalent mass;
means for increasing the equivalent mass of the resonator from the first equivalent mass to a second equivalent mass, wherein the means for increasing the equivalent mass comprise a plurality of masses electroformed affixed along a planar surface of a periphery of the hemispherical resonator's outer rim;
means for driving the hemispherical resonator; and
means for sensing an orientation of a vibration pattern of the hemispherical resonator.

13. The rotation sensor of claim 12, wherein the plurality of masses are composed of a heavy metal selected from the group consisting of gold, platinum, tungsten, and lead.

14. The rotation sensor of claim 12, wherein the plurality of masses are equally spaced around the outer rim of the resonator.

15. The rotation sensor of claim 12, wherein the plurality of masses are positioned at points of maximum deflection of the vibrating resonator.

16. The rotation sensor of claim 15 wherein the points of maximum deflection are based, at least in part, on at least one vibrational mode of the resonator.

17. The rotation sensor of claim 16 wherein:
the at least one vibrational mode of the resonator comprises a cos 2θ vibrational mode; and
the plurality of masses comprise eight masses positioned at 45 degree increments around the rim of the resonator.

18. The rotation sensor of claim 12 wherein the resonator has a diameter of 2 mm or less and a ring down time of 500 seconds or longer.

19. The rotation sensor of claim 12, wherein each of the plurality of masses is symmetric about a radial vector going out to each mass.

20. The rotation sensor of claim 19 wherein each of the plurality of masses is wedge shaped.

21. The rotation sensor of claim 12, wherein each of the plurality of masses has a substantially identical weight.

22. The rotation sensor of claim 12, wherein:
the plurality of masses have different weights;
heavier masses are positioned at points of maximum deflection of the resonator; and
lighter masses are positioned between the points of maximum deflection.

23. A gyroscope comprising:
a hemispherical resonator; and
a plurality of masses electroformed affixed along a planar surface of a periphery of the hemispherical resonator's outer rim, wherein at least some of the plurality of masses are positioned at points of maximum deflection of the hemispherical resonator and are configured to increase an equivalent mass of the hemispherical resonator.

24. The gyroscope of claim 23 wherein the plurality of masses are positioned around the outer rim of the hemispherical resonator.

25. The gyroscope of claim 23 wherein the plurality of masses are composed of a heavy metal selected from the group consisting of gold, platinum, tungsten, and lead.

26. The gyroscope of claim 23 wherein at least some of the plurality of masses are positioned between points of maximum deflection of the hemispherical resonator.

27. The gyroscope of claim 26 wherein the masses positioned at points of maximum deflection of the hemispherical resonator have a greater weight than the masses positioned between points of maximum deflection of the hemispherical resonator.

* * * * *